UNITED STATES PATENT OFFICE.

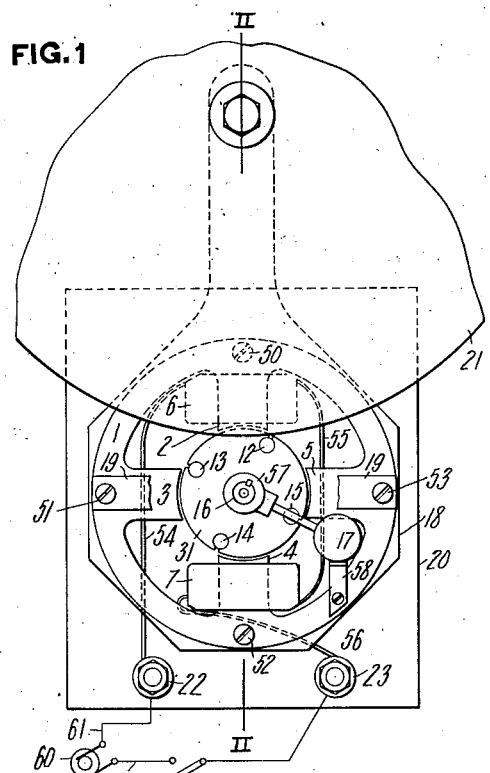

JOHN D. TAYLOR, OF EDGEWOOD PARK, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRIC MOTOR.

1,102,819.  Specification of Letters Patent.  Patented July 7, 1914.

Application filed March 8, 1912. Serial No. 682,343.

*To all whom it may concern:*

Be it known that I, JOHN D. TAYLOR, a citizen of the United States, residing at Edgewood Park, in the county of Allegheny and State of Pennsylvania, have invented certain new and useful Improvements in Electric Motors, of which the following is a specification.

My invention relates particularly to electric motors of the oscillating type.

A motor embodying my invention is particularly adapted for the operation of electric bells, although its use is not limited to this adaptation.

I will describe two forms of motor embodying my invention and then point out the novel features thereof in claims.

In the accompanying drawings, Figure 1 is a plan view showing one form of electric motor embodying my invention, and showing its application to a bell. Fig. 2 is a sectional view on the line II—II of Fig. 1, but showing the oscillating member in a slightly different position. Fig. 3 is a view showing a modified form of motor embodying my invention. Figs. 4 and 5 are views similar to Fig. 3 but showing the oscillating member at different points in its movement.

Similar reference characters refer to similar parts in each of the several views.

One feature of the motor embodying my invention is the absence of contacts or commutator of any kind.

Referring to Figs. 1 and 2 of the accompanying drawings, 1 designates a field member built up of laminated soft iron and comprising four inwardly projecting poles 2, 3, 4, and 5. This field is supported on four posts 50, 51, 52 and 53, which in turn are mounted in a base plate 18. 31 is an oscillating member, which may be termed an oscillator and which is also built up of laminated soft iron. This oscillator is fixed on a shaft 16 which is pivotally mounted in a lug 19ª on the plate 18 and in a cross bar 19 mounted on the tops of posts 51 and 53. In Fig. 1 the middle portion of this cross bar is broken away to more clearly show the oscillator 31. Passing through the oscillator 31 are four rods 12, 13, 14 and 15 of conducting material preferably copper. These rods are located substantially ninety degrees apart and are all electrically connected on each side of the oscillator by means of plates 24 and 25 of conducting material, preferably of copper, thereby forming a structure similar to the squirrel-cage rotor of an induction motor. Field poles 2 and 4 are provided with exciting coils 6 and 7 respectively; poles 3 and 5 have no exciting coils, but they provide a magnetic path for flux produced by current induced in the circuit comprising the copper rods 12 and 14 and the plates 24 and 25, as will hereinafter be explained. 20 is a block of insulating material such as wood secured to the base plate 18. This block carries terminal posts 22 and 23 to which the coils 6 and 7 are connected by means of conductors 54, 55 and 56. Coils 6 and 7 are supplied with alternating current from a source 60 which is connected with the terminal posts 22 and 23 by conductors 61 and 62, a circuit controller 63 being included in conductor 62 for controlling the bell.

The modified form of motor shown in Fig. 3 is similar to that shown in Figs. 1 and 2, except that rods 13 and 15 are omitted from the oscillator, which I have here designated 31ª, and pole-pieces 3 and 5 are omitted from the field, which I have here designated 1ª. I will first explain the operation of the form of motor shown in Fig. 3, referring also to Figs. 4 and 5 which show the oscillator 31ª in different positions of its movement. Assume that the oscillator 31ª occupies the position in which it is shown in Fig. 3, and that alternating current is then supplied to the coils 6 and 7. The closed electric circuit comprising rods 12 and 14 then tends to place itself in such position that its plane is parallel to the direction of the magneto-motive force between pole-pieces 2 and 4, this being the position in which it is shown in Fig. 4, which I will term the middle position; this is in accordance with the well-known law that a closed circuit in a field of alternating magnetic flux tends to place itself in such position that none of the flux passes through it. The force thus acting on the oscillator may be termed the transformer torque. If the torque just mentioned were the only one tending to produce motion of the oscillator, even though the momentum would carry the oscillator beyond the middle position and it would then be drawn back toward the middle position by a similar torque, the oscillations would soon cease because the torques on each side of the middle position are equal and opposite. The action would be analogous to that of a pendulum having a fixed axis of suspension; such a pendulum will, when started, oscillate for a time, but the amplitude of oscillation will gradually decrease until the pendulum finally comes to rest. But, in addition to the transformed torque, there is another torque acting on the oscillator due to the movement of the rods 12 and 14 across the magnetic field. This movement, or cutting of the magnetic lines of force, induces alternating current in the circuit comprising these rods, which current I will herein term the "speed" current. This current produces a magnetic flux which flows through the circuit comprising the rods 12 and 14, and which combines with the primary flux to form a resultant flux. The speed current coacts with this resultant flux to produce a torque which tends to continue the movement of the oscillator beyond its middle position. The force thus acting on the oscillator may be termed the "speed" torque. The combined action of this last torque and of the torque tending to place the oscillator in its middle position makes the device analogous to a pendulum having a movable axis of suspension; if the axis of such a pendulum is moved by external agency at each oscillation and in the direction of movement of the pendulum, the oscillations will continue indefinitely. After the oscillator 31ª passes the middle position (the position shown in Fig. 4) the transformer torque, tending to return the oscillator to the middle position, acts in opposition to the speed torque and to the momentum, and when the oscillator reaches the point at which the transformer torque balances the two latter forces, the oscillator stops and the actions just described are repeated in the other direction. Of course, if any other force, such as gravity or a spring is acting on the oscillator, this other force must be added to or subtracted from the sum of the speed torque and the momentum in determining the point at which the oscillation will stop. In order words, the oscillation stops when the transformer action balances all other forces acting on the oscillator. In order to prevent continuous rotation, the parts of the device must be so proportioned that the balancing of the torques occurs before the oscillator reaches such a point that the transformer torque would tend to continue the rotation in the counter-clockwise direction. Obviously, with the form of motor shown in Figs. 3, 4 and 5 the parts must be so proportioned that this balancing occurs before the oscillator swings 90° in either direction from its middle position, and this proportioning involves chiefly, and probably only, the proper relative length of arc of the pole-faces and of the spaces between pole-faces. One reason for this is that while the rods 12 and 14 are opposite the pole-pieces, the transformer torque is always less than the speed torque, hence the length of the pole-faces must be such that after the rods pass from under them the transformer torque can balance the other two torques before the oscillator has swung too far. One important feature of my invention lies, therefore, in the proper proportioning of these arcs.

Referring now to Figs. 1 and 2, in the form of motor shown, the same actions occur as in the form shown in Fig. 3, with an additional speed torque which renders the motor more efficient. Assuming that the oscillator is in the position shown in Fig. 1, when the alternating current is applied, the circuit including rods 12 and 14 tends to place itself parallel to the direction of flux between pole-pieces 2 and 4 for the same reason as before. The circuit including rods 13 and 15 also tends to place itself in a like position, but the tendency of the former circuit exceeds that of the latter because the former circuit is nearer this position than the latter. (This tendency is really due to the flux which passes around the circuit without passing through it, and obviously more flux can pass around the circuit comprising rods 12 and 14 than around that comprising rods 13 and 15.) The movement of rods 12 and 14 across the flux induces a speed current in the circuit of these rods as before, and this current sets up a speed flux as before, but in the structure of Fig. 1 there is a path of low reluctance for this flux through the pole-pieces 3 and 5 and the field 1. The primary flux between pole-pieces 2 and 4 also induces current in the circuit comprising rods 13 and 15, and this current coacts with the speed flux to tend to continue the rotation of the oscillator 31. The movement continues, as before explained, until the sum of the speed torque plus the momentum is balanced by the transformer torque tending to return the circuit of rods 12 and 14 to the middle position. With the structure shown in Fig. 1 this balancing must occur before the oscillator has swung 45° from its middle position, because otherwise the circuit of rods 13 and 15 would become more nearly parallel to the direction of the primary flux than the circuit of rods 12 and 14, and continuous rotation would result. Here again oscillation depends on the proper proportioning of the parts, and this proportioning involves chiefly, and probably only, the relative lengths of arc of pole-face and of space between pole-faces.

As mentioned hereinbefore, a motor embodying my invention is adapted for the operation of a bell. In Figs. 1 and 2 I have shown a bell 21 mounted upon the base 18. Secured to the oscillator shaft 16 is a collar 57 which carries a clapper 17 arranged to strike the bell when the oscillator is actuated. The entire structure including motor and bell is preferably mounted in the position shown in Figs. 1 and 2 in which the motor is below the bell, so that when the motor is deënergized the clapper 17 will hang away from the bell by gravity. The downward movement of the clapper and armature may then be limited by means of a suitable stop 58 as indicated in Fig. 1. The rate of oscillation of the oscillator is entirely independent of the frequency of the alternating current supplied to the motor winding, and is dependent only on the energy supplied and on the inertia of the oscillating parts. With the form of motor shown in Figs. 1 and 2, in order to have the oscillations start in the proper quadrant it is necessary that when the motor is at rest the plane of rods 12 and 14 should make a smaller angle with the direction of the primary flux than does the plane of rods 13 and 15, and for this purpose I provide the mechanical stop 58. I have found, however, that the amplitude of oscillation is limited by the electromagnetic forces without the use of mechanical stops, and I have also found that a mechanical stop limiting the swing to one side of the middle position also limits the swing to the other side. In Fig. 1 the stop 58 and bell 21 are so located relative to the middle position of the oscillator 31 that the downward movement of the clapper is limited by the electromagnetic forces and the clapper therefore does not strike the stop 58 while the motor is in operation. By this arrangement I avoid the damping effect which would result if the stop 58 were so located as to be struck by the clapper. In other words, the gong is so located as to be struck by the clapper when the latter is just reaching the upper limit of its stroke. I have found that if, while the motor is at rest, the angle between the direction of flux and the plane of rods 12 and 14 is very small, the oscillations at the start will be of small amplitude but will rapidly increase in amplitude until the full swing is reached. With the location of the stop 58 shown in the drawings, the oscillations will immediately reach their full amplitude when current is applied.

Although I have shown and described only two forms of electric motor embodying my invention, it is understood that various changes and modifications may be made therein within the scope of the appended claims without departing from the spirit and scope of my invention.

Having thus described my invention, what I claim is:—

1. An electric motor comprising an oscillator having a closed electric circuit, and means for passing alternating magnetic flux through said oscillator, whereby a transformer torque is exerted on said circuit which tends to swing the oscillator to a middle position in which none of said flux passes through said circuit and whereby the current induced in said circuit by its motion through the flux reacts on said flux to produce a speed torque which tends to continue the movement of the oscillator beyond said middle position, the parts being so proportioned that after the oscillator has swung beyond said middle position the reversed transformer torque tending to return it to the middle position balances the sum of the speed torque, the momentum and all other forces before the oscillator reaches such position that the transformer torque again reverses and tends to continue the rotation.

2. An electric motor comprising an oscillator having a closed electric circuit, means for passing alternating magnetic flux through said oscillator, means for biasing said oscillator to such position that a portion of said flux passes through said circuit, whereby a transformer torque is exerted on said circuit which tends to swing the oscillator to a middle position in which none of said flux passes through said circuit, and whereby the current induced in said circuit by the motion of the circuit through the flux reacts on said flux to produce a speed torque which tends to continue the movement of the oscillator beyond said middle position, the parts being so proportioned that after the oscillator has swung beyond said middle position the reversed transformer torque tending to return it to the middle position balances the sum of the speed torque, the momentum and the biasing means before the oscillator reaches such position that the transformer torque again reverses and tends to continue the rotation.

3. An electric motor comprising an alternating current electromagnet, an oscillator mounted between the pole-pieces of said magnet and having a closed electric circuit whereby the flux passing through said oscillator produces a transformer torque on said closed circuit tending to swing the oscillator to a middle position in which none of said flux passes through said circuit and whereby the current induced in said circuit by the motion of the circuit through the flux reacts on said flux to produce a speed torque which tends to continue the movement of the oscillator beyond said middle position, the relation of the length of arc of the pole-pieces and of the space between pole-pieces being such that after the oscillator has swung beyond said middle position the reversed transformer torque tending to return it to the middle position balances the sum of the speed torque, the momentum and all other forces before the oscillator reaches such position that the transformer torque again reverses and tends to continue the rotation.

4. An electric motor comprising a field member of magnetizable material having four inwardly projecting pole-pieces disposed substantially in quadrature, windings on an oppositely located pair of said pole-pieces, for passing alternating magnetic flux between the last-mentioned pole-pieces, an oscillator mounted between said pole-pieces and comprising a core of magnetizable material having two closed electric circuits disposed substantially in quadrature relation, means for biasing said oscillator to such position that the plane of one of said closed circuits makes a smaller angle with the direction of the said flux than does the plane of the other circuit, whereby the transformer torque exerted on said circuits by said flux acts to swing the oscillator to a middle position in which none of the said flux passes through the first-mentioned closed circuit, and whereby the speed current induced in said first-mentioned circuit causes an alternating magnetic flux to flow through the oscillator and the two pole-pieces not provided with windings, which flux reacts on the transformer current induced in the second of said closed circuits to produce a speed torque which tends to continue the movement of the oscillator beyond said middle position, the parts being so proportioned that before the oscillator has swung forty-five degrees from said middle position the reverse transformer torque tending to return the oscillator to the said middle position balances the said speed torque and the momentum and the said biasing torque.

In testimony whereof I affix my signature in presence of two witnesses.

JOHN D. TAYLOR.

Witnesses:
WILLIAM H. CADWALLADER,
L. FREDERIC HOWARD.